United States Patent [19]

Steinhagen

[11] 4,324,387
[45] Apr. 13, 1982

[54] POWER DELIVERY SYSTEM HAVING A PRESSURE MODULATED HYDRODYNAMIC RETARDER FOR CONTROLLING A LOAD

[75] Inventor: Horst G. Steinhagen, Racine, Wis.

[73] Assignee: Twin Disc, Incorporated, Racine, Wis.

[21] Appl. No.: 116,792

[22] Filed: Jan. 30, 1980

[51] Int. Cl.³ .................... B66D 5/02; F16D 57/02
[52] U.S. Cl. .................... 254/310; 60/367; 188/180; 188/291; 188/296; 254/267; 254/281; 254/367; 254/321; 254/377
[58] Field of Search .............. 254/310, 321, 274, 275, 254/267, 281, 282, 303, 323, 326, 349, 361, 377, 366, 321, 303; 188/296, 290, 291, 264 D, 180; 60/367; 192/3.34, 323, 321

[56] References Cited

U.S. PATENT DOCUMENTS

| | | | |
|---|---|---|---|
| 3,072,224 | 1/1963 | Woody et al. | 188/264 D |
| 3,863,739 | 2/1975 | Schaefer et al. | 188/296 |
| 3,917,230 | 11/1975 | Barron | 254/274 |
| 3,931,870 | 1/1976 | Memmer | 188/296 |
| 4,043,434 | 8/1977 | Braschler | 188/296 |

*Primary Examiner*—Billy S. Taylor
*Attorney, Agent, or Firm*—James E. Nilles

[57] ABSTRACT

A pressure modulated hydrodynamic retarder is provided for a power delivery system and speed sensing means is provided for sensing the rotational speed of the output of the retarder for producing a corresponding pressure fluid flow which acts to vary the fluid relief pressure of a pressure control valve for the retarder and consequently varies the torque of the retarder in accordance with its rotor speed. In this manner the retarder is modulated as determined by its output speed and when the invention is used in a hoisting operation, as the lowering speed increases due to the falling load the retarding action of the retarder also increases. A particularly desirable form of sensing means includes a variable flow fluid pump which is driven at a speed proportional to the lowering speed of the load to proportionately vary the retarding ability of the retarder. The retarder system may include a one-way clutch between the retarder rotor and the power output shaft to provide for free-wheeling of the retarder when the shaft is rotated to raise the load, and which one-way clutch connects the rotor to the shaft when the shaft is rotating in the opposite direction to lower the load and this arrangement permits raising of the load without interference from the retarder and then automatically connects the retarder to the shaft when the load is lowered.

35 Claims, 17 Drawing Figures

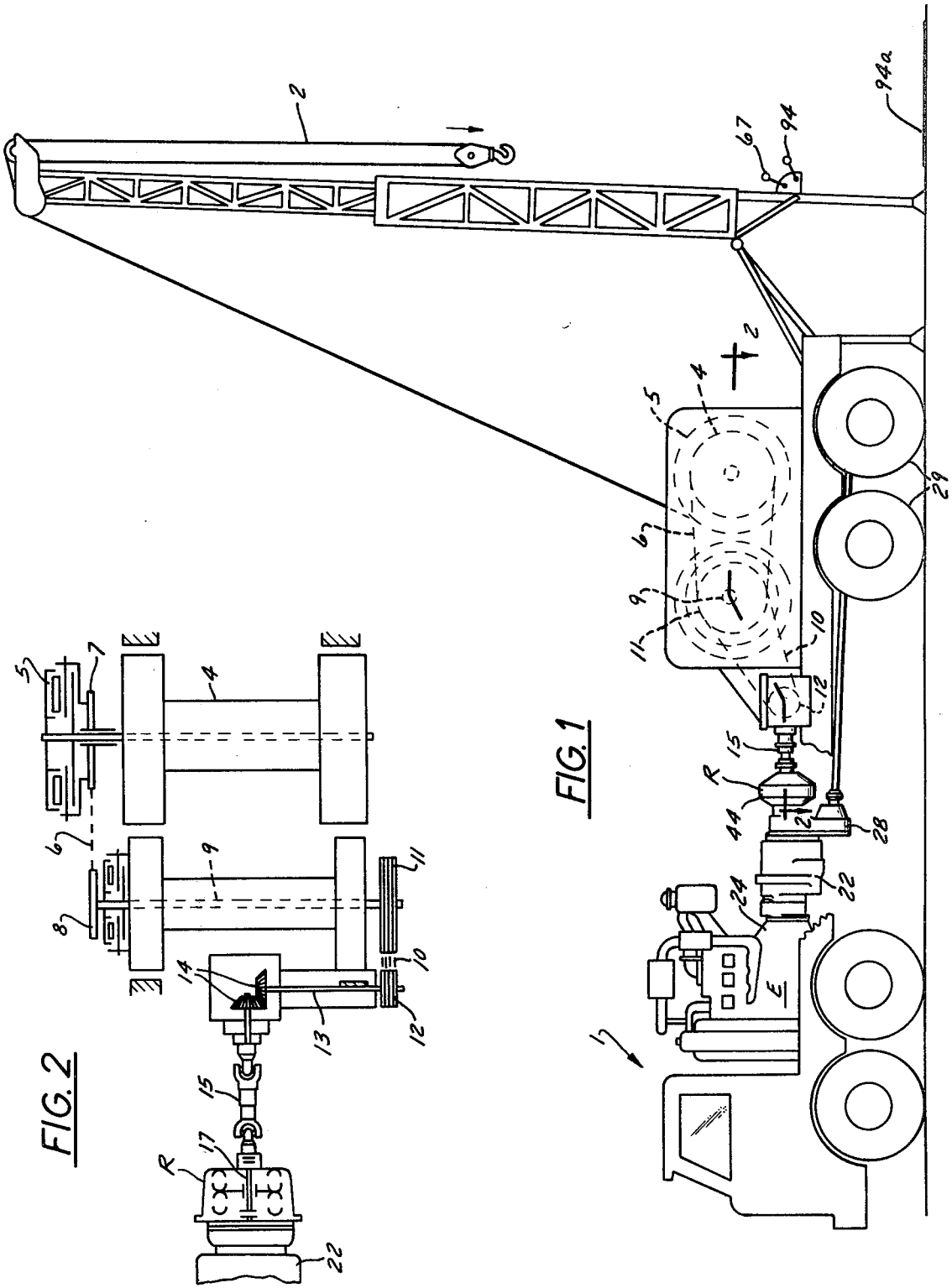

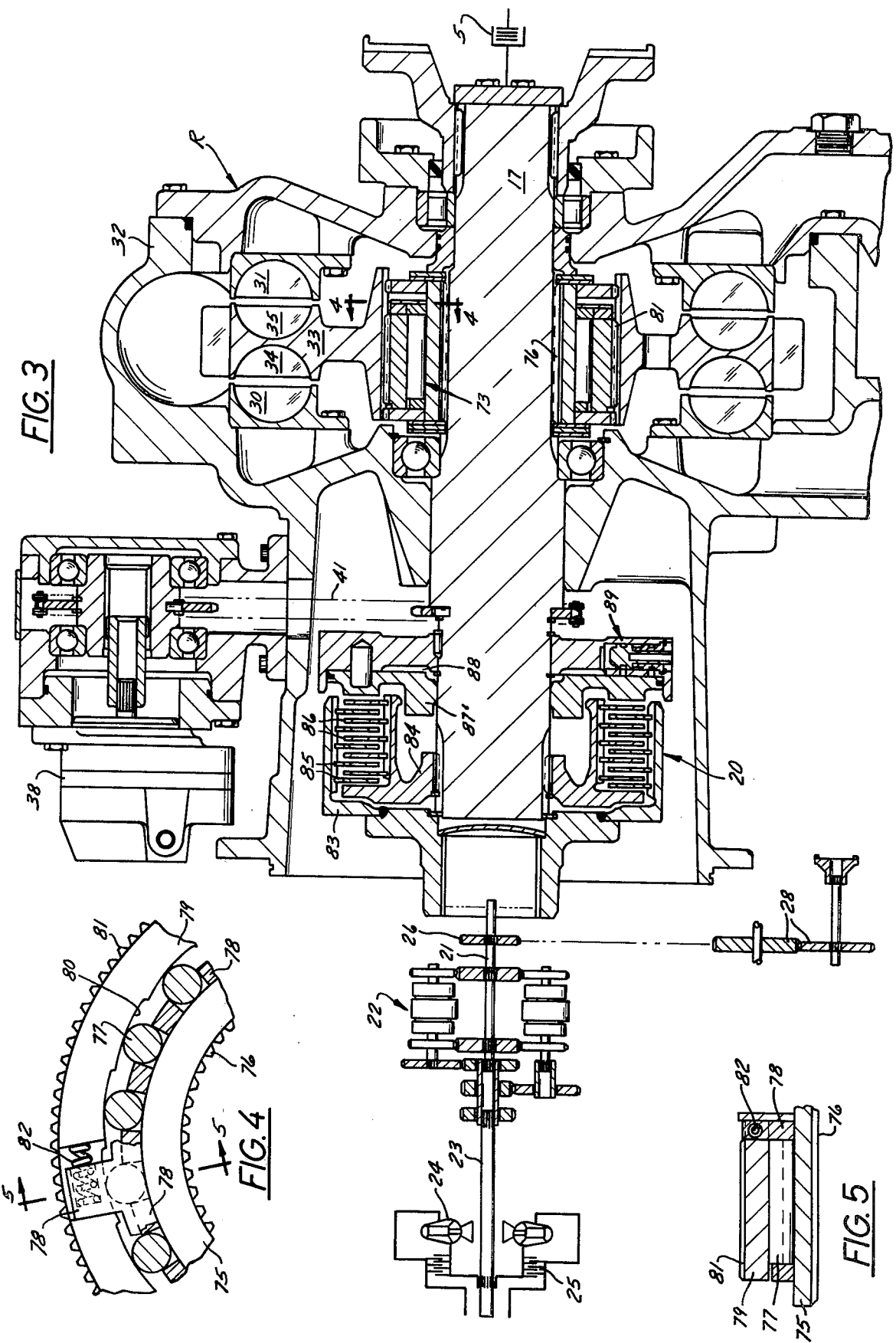

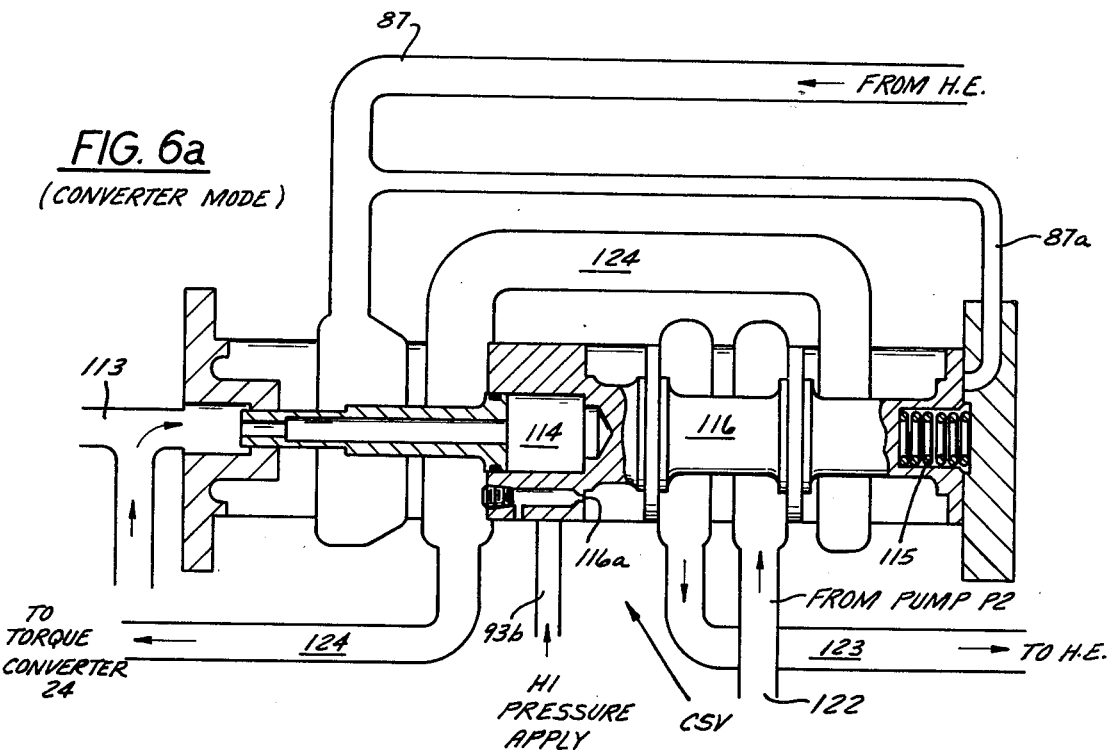
FIG. 6a (CONVERTER MODE)
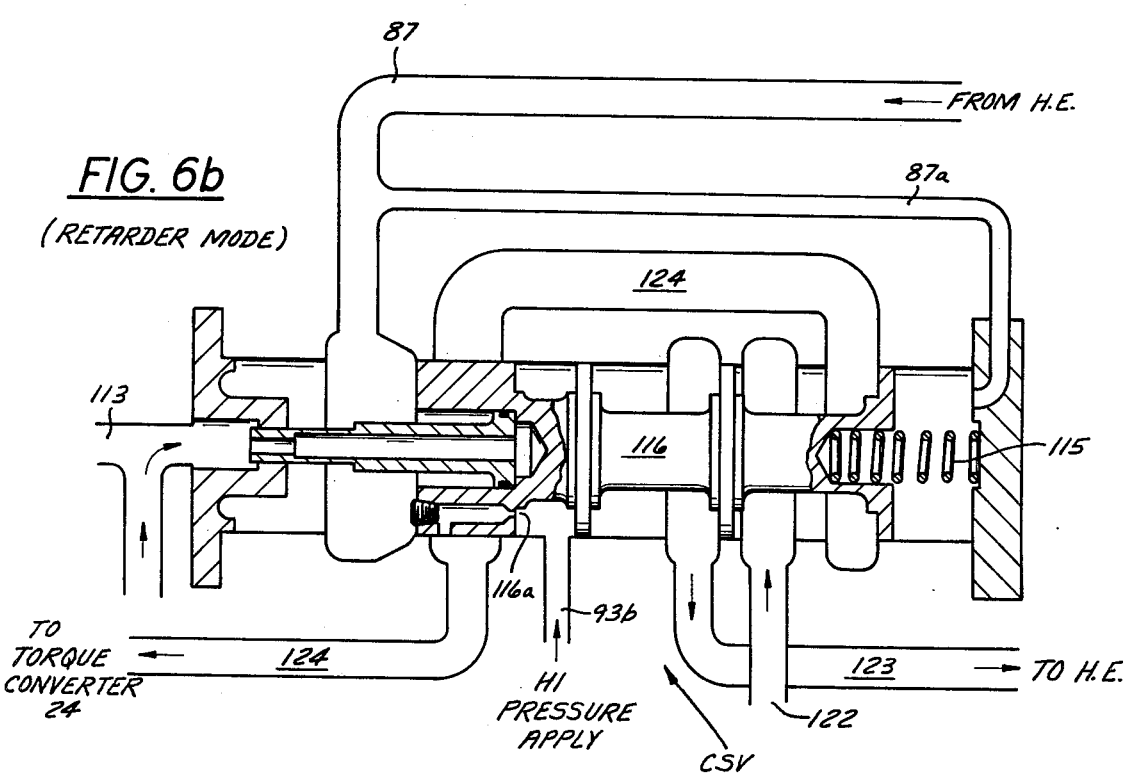
FIG. 6b (RETARDER MODE)

4,324,387

POWER DELIVERY SYSTEM HAVING A PRESSURE MODULATED HYDRODYNAMIC RETARDER FOR CONTROLLING A LOAD

BACKGROUND OF THE INVENTION

This invention relates generally to hydrodynamic retarders which control the speed of a descending load and such a system, for example, finds particular utility in oil well servicing and drilling rigs of the mobile type and wherein pipes are lowered into and raised out of oil wells. Some of these prior art rigs utilized water retarders which were of the essentially constant pressure type and required a water system and an associated water holding tank, and U.S. Pat. No. 3,072,224 issued Jan. 8, 1963 is an example of that type.

The torque capacity of a hydrodynamic retarder is a square function of the fluid velocity in the circuit, which in turn is essentially proportional to the rotational velocity of its rotor, as long as there is no fluid cavitation. Cavitation causes a reduction of the torque being transmitted, it can be suppressed by increasing the basic pressure in the hydraulic circuit. The higher the rotor speed, the higher the pressure that is required to prevent cavitation.

A constant pressure retarder has a torque versus speed performance curve that follows the square function law up to a certain speed after which the torque increase with speed is substantially less or even zero. A series of basic circuit pressure settings provide a series of torque versus speed curves that branch off the square function curve at different speeds and torque levels. Some prior art units, utilizing oil as the operating fluid, are equipped with circuit pressure adjustment features. These prior art units having constant but adjustable pressure settings, provide a means of matching the power absorption characteristics of the retarder to the load, but the torque versus speed relationship is undesirable for load lowering purposes. The poor torque response to speed changes in the cavitating range makes the device unsuitable for speed control of a constant load. Minute variations in the applied load, drive line resistance, circuit pressure and even fluid temperature can result in substantial speed variation for a given pressure setting. In other words, there is no definite intersection between the torque vs. speed curve produced by the load and the retarder torque curve. It is important to the operator of a load lowering system that the lowering velocity is predictable and repeatable.

Another disadvantage of the relatively flat torque versus speed curve for load lowering functions is the high power absorption at speeds below the desired speed. This means that the acceleration of the load is severely inhibited by the retarder and the time to reach the desired lowering velocity can be excessive. As a result, existing retarders are normally not used for light and medium load lowering operation.

U.S. Pat. No. 4,043,434 is an example of the prior art dealing with the design of the hydrodynamic retarder itself and deals with the shortcomings of the various prior art devices. This patent accomplishes torque control by restricting the internal circuit flow velocity with ring valves which is mechanically complicated and expensive.

Another prior at retarder control is shown in U.S. Pat. No. 3,863,739 issued Feb. 4, 1975 which utilizes a torque converter, hydrodynamic retarder and fluid circuitry in a system which has pressure sensing valves that sense the pressure differential across the inlet and outlet of the retarder for control purposes. A direct speed sensing device is not employed, but instead this patent advocates the pressure differential approach for control. That control system has certain shortcomings as to its ability to operate consistently at any speed and accurately, and the pressure differential is not a good indicator, particularly when cavitation exists in the retarder circuit. Furthermore, the manual control consisting of a series of solenoids which effect the level of pressure developed in the circuit is not infinitely variable.

SUMMARY OF THE PRESENT INVENTION

The present invention provides a pressure modulated hydrodynamic retarder wherein the output speed of the retarder is sensed and a resulting speed signal causes a corresponding change in the outlet pressure of the retarder and consequently its torque. Various forms of speed sensing means are contemplated, one of which includes an output driven variable flow fluid pump. A more specific aspect of the invention includes a variable orifice in the fluid circuit which allows a change of range of pressure of the retarder outlet pressure and consequently the torque of the retarder. The retarder is thus modulated in accordance with its output speed and the result is to provide an infinitely variable retarder that has low torque at low speeds and high rotor torque at high speeds, giving high initial load acceleration and good load lowering velocity control. The invention provides for torque adjustment of the retarder over a broad range in order to obtain desired lowering velocities for varying loads.

Another aspect of the invention provides for a overrunning clutch for the retarder and which acts to automatically disconnect the retarder in the load hoisting operation.

The present invention provides a power delivery system including a hydrodynamic torque converter and a speed sensing device for the output of the retarder and which is consistent and accurate at all speeds and even though cavitation of the system may occur. This speed sensing device is independent of the retarder circuit and the speed signal is fed back into the pressure control system. The output speed sensing device is operative to regulate the outlet pressure of the retarder and furthermore a variable orifice is provided in the hydraulic system which provides a change in the range of outlet pressure with corresponding changes in the torque delivered by the retarder. Various modifications of the speed sensing means are contemplated.

Another aspect of the invention relates to a power delivery system of the above type when used with a transmission having a torque converter for raising a load in a hoisting rig, and also includes a circuit switching valve which selectively switches the fluid circuit from the torque converter to the retarder. For this purpose, a circuitry switch valve acts to switch the oil circuit from a torque converter mode to a retarder mode of operation, that is, this valve allows the majority of the oil to circulate either through the converter for load raising or through the retarder for load lowering, depending upon which mode of operation is desired.

Another and more specific aspect relates to an arrangement where a clutch acts to disconnect the power transmission when the retarder becomes operative to control the lowering speed of the load. A pneumatic control system provides an on/off signal to the clutch for the hoist drum and a disconnect clutch control valve and provides an interlock in the system to prevent engagement of the disconnect clutch of the transmission while the hoist drum clutch is engaged for lowering, acting to prevent high energy engagements of the disconnect clutch. Thus, the pneumatic circuit acts to protect the clutch.

Another aspect of the invention relates to a retarder of the type wherein the hydraulic system for the retarder and for the transmission are integrated thereby eliminating the need for other apparatus.

A more specific aspect of the invention relates to the use of such a pressure modulated retarder as applied to an oil well servicing and drilling rig and a power transmission for driving the hoist drum of such a rig.

These and other objects and advantages of the present invention will appear hereinafter as this disclosure progresses, reference being had to the accompanying drawings.

BRIEF DESCRIPTION OF THE DRAWINGS

FIG. 1 is a side elevational view of a drilling rig with which the present invention finds particular utility;

FIG. 2 is a schematic, sectional view taken generally along the line 2—2 in FIG. 1;

FIG. 3 is an enlarged, longitudinal, cross-sectional view through the load lowering retarder, disconnect clutch and also showing the drive transmission in schematic form;

FIG. 4 is a fragmentary view taken generally along the line 4—4 in FIG. 3, but on an enlarged scale and showing the details of the overrunning clutch;

FIG. 5 is a sectional view taken generally along the line 5—5 in FIG. 4, but on a reduced scale;

FIG. 6a is an enlarged, sectional view of the circuitry switch valve shown in FIG. 6, the valve being shown in converter mode of operation;

FIG. 6b is an enlarged sectional view of the circuitry switch valve shown in FIG. 6, the valve being shown in retarder mode of operation;

FIG. 10 is a magnetic electric system of speed sensing;

FIG. 11 is a magnetic form of speed sensing;

FIG. 12 shows a mechanical means, such as a flyball governor, for speed sensing;

FIG. 12A shows a mechanical linkage for controlling a modulating valve for speed sensing;

FIG. 12B also shows a mechanical linkage for controlling a variable orifice valve for the purpose of speed sensing; and FIG. 13 is a modification of a hydraulic arrangement.

DESCRIPTION OF A PREFERRED EMBODIMENT

Figure 6:
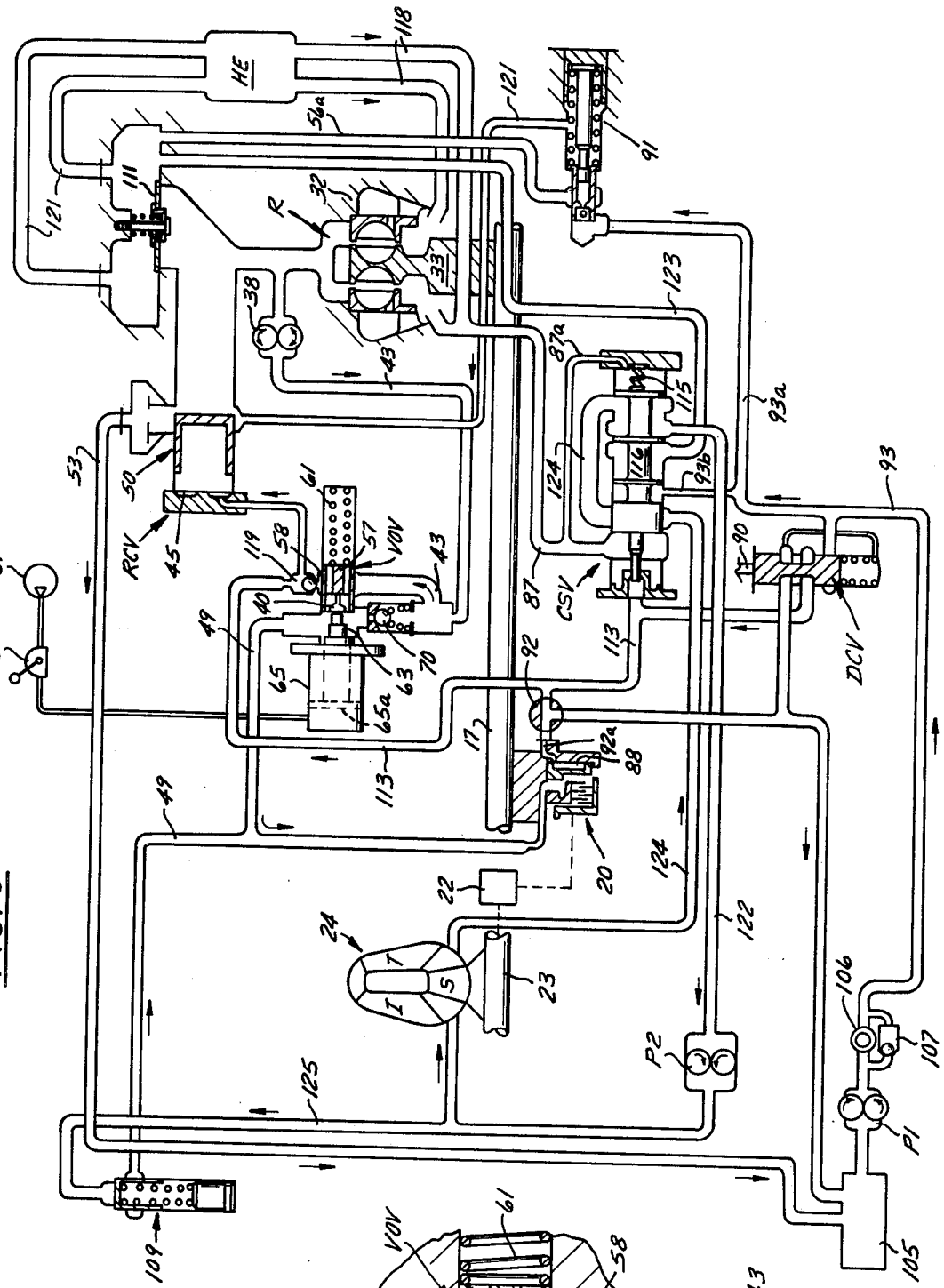
FIG. 6 is a circuit diagram of the hydraulic system used with the present invention.

The invention has been shown as applied to an oil field servicing rig wherein the invention finds particular utility in controlling the lowering of the load, but the invention finds uility in other environments and equipment. This rig includes a mobile, self-propelled vehicle 1 (FIG. 1) having an internal combustion engine E mounted thereon and is used to clean oil wells, remove and replace sucker rods, and oil pipes, all of which are attached to the end of the hoist cable 2. For example, a chain of oil pipes may consist of many sections of pipes that extend thousands of feet down into the earth and when lowering this chain of pipe sections, it is necessary to accurately and positively control the rate at which the heavy chain of pipe is lowered. For the purpose of raising and lowering the load attached to the cable 2, a hoist drum 4 mounted on the rig has a pneumatically operated drum clutch 5 of the interleaved friction plate type. The power input to the hoist drum clutch is through endless multiple chains 6 trained around the input sprocket 7 of the clutch and sprocket 8 secured to the end of a shaft 9. The shaft 9 is in turn driven by the multiple chains 10 trained around the multiple sprockets 11 and 12. The sprockets 12 are secured to another cross shaft 13 which is driven through a set of bevel gears 14 from the power take-off shaft 15 that extends from power output shaft 17.

The shaft 17 receives power through a disconnect clutch 20 which is connectible between the shaft 17 and a transmission shaft 21. The transmission shaft is driven through a conventional gear transmission 22 which provides a number of gear ratios and consequently a number of output speeds for shaft 21. Power is delivered to the gear transmission 22 through shaft 23 and through a conventional torque converter 24 from the engine E or through an intervening and conventional interleaved friction plate type clutch 25.

As furthermore shown in FIG. 3, power is also delivered from shaft 21 through gear 26 and to a drop box gear transmission 28 (FIGS. 1 and 3) for the purpose of driving the ground wheels 29 of the vehicle.

Retarder

The hydraulic retarder R includes a series of circumferentially spaced, axially extending and oppositely facing, fixed vanes 30 and 31 which are fixed in the stationary housing 32. The rotor 33 rotates between these fixed vanes and has a series of circumferentially spaced, axially extending vanes 34 and 35, facing respectively the fixed vanes 30 and 31 and co-acting therewith to produce the necessary retarding action when the retarder is filled with fluid. The retarder is always pressurized at a pressure which is variable in accordance with the present invention, thereby providing a modulating pressure retarder for load lowering functions.

Hoist Retarder Outlet Pressure Control Valve (RCV) And Output Driven Pump

The present invention utilizes an adjustable output speed sensing means for modulating the fluid pressure of the retarder R which produces in the retarder an increasing pressure with an increase in speed of the retarder. This results in desirable characteristics and control of the retarder, namely, it raises the retarder torque curve at higher speeds (see FIG. 9) and provides improved speed control at variable loads. The output speed sensing means for providing th above mentioned output speed signal may take various forms, as will be referred to hereinafter. For purposes of illustrating the invention, this means has been shown in the form of a variable flow fluid pump 38 driven through an endless chain 41 from the output shaft 17. Reverse rotation (load lowering direction) of the output shaft 17 causes the output driven pump 38 to deliver fluid via conduit 43 into a pilot end 45 of a hoist retarder outlet pressure control valve RCV, the fluid is discharged through a variable orifice 40 into the lubrication conduit 49. The relief valve pressure setting of a shiftable element 50 of the retarder outlet pressure regulating valve RCV, which is located in the hydraulic system between the discharge side of the retarder and a conduit 53 leading to the sump, is a direct function of the pilot pressure in conduit 43. As flow from the pump 38 is proportional to the speed of shaft 17 and the pressure drop across an orifice is a square function of flow, the retarder circuit pressure is an approximate square function of output speed, thus, the RCV valve regulates retarder circuit outlet pressure dependent upon retarder output speed.

As will appear hereinafter, the pump 38 is driven at a rate which is determined by the rotational speed of the retarder when the latter is acting to lower the load.

Variable Orifice Valve (VOV)

Figure 7:
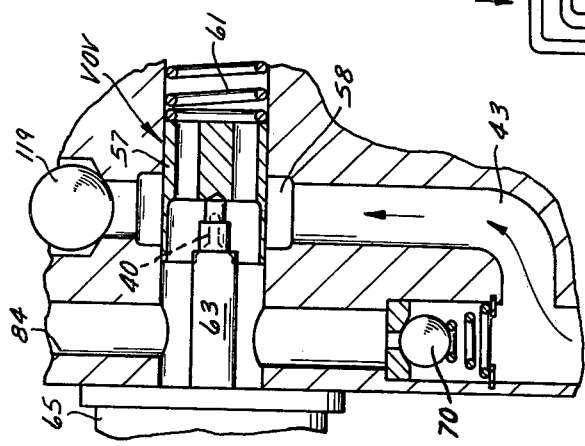
FIG. 7 is a enlarged, fragmentary view of a portion of the FIG. 6 diagram and showing the hydraulic orifice which is modulated with air pressure.

A variable orifice valve VOV includes an axially shiftable valve element 57 (FIG. 7) surrounded by an annular groove 58 which receives pressure fluid from conduit 43. The pressure in conduit 43 is a function of the pump 38 discharge flow and the position of the valve VOV. The generally tubular valve element 57 has a pair of diametrically spaced, variable width slits forming an orifice 40. When the valve element 57 is urged to the right (FIG. 7) against the bias of its spring 61, by means of a plunger 63 of a variable pressure air cylinder 65, the valve element 57 provides a size of orifice depending on the amount of its axial movement and consequent opening of the variable orifice. The piston 65a (FIG. 6) of the pneumatic cylinder 65 is modulated by a manually operated, air pressure valve 67.

Valve 67 may be of the type manufactured by Wabco (Westinghouse Air Brake Co.) Model H-2-EFX, which modulates the air pressure which is delivered from the compressed air source 69 as the valve lever is moved.

Thus the variable orifice valve VOV is a means to raise or lower the pressure range through which the variable flow from pump 38 acts to modulate the fluid pressure in the retarder, thereby providing a simple adjustment feature for the purpose of matching the retarder torque capacity to the load.

General

A spring biased check valve 70 (FIGS. 6 and 8) is provided in parallel with the orifice 40. The valve 70 permits the output driven pump 38 to draw fluid from lubrication circuit line 49 when the shat 17 is running in the forward (load raising) direction. This will prevent cavitation of the suction side of pump 38 when the variable orifice valve element 57 is positioned at a small orifice setting and the pump 38 is running in a forward direction. Such cavitation would cause control problems upon reversal and also possible damage to the pump.

Over-Running Clutch

The pressure modulated retarder R is located between the fixed housing 32 of the retarder and the shaft 17, and has rotor 33 mounted on shaft 17 through an over-running or one-way clutch 73. The function of the over-running clutch 73 is to permit the shaft 17 to drive the hoist drum 4 in a load raising operation and at the same time automatically disconnect the retarder rotor 33. During such a hoisting operation it permits the rotor 33 to free-wheel, and prevents it from acting as a drag or brake during the hoisting operation. During the load lowering operation, however, the retarder is engaged through the over-running clutch, that is, the retarder is connected to the shaft 17. The overrunning clutch includes a race 75 (FIGS. 4 and 5) having splines 76 by means of which it is fixed to a splined portion of shaft 17. A series of cylindrical rollers 77 are located in the roller cage 78 and are supported on the inner race 75. A cam member 79 has a series of cam surfaces or cam ramps 80 having an angle of about 7 degrees. The cam member 79 has a series of external splines 81 by means of which it is fixed to complementary internal splines in the rotor 33. A spring 82 acts between the cage 78 and the cam 79 to urge the rollers 77 into contact with their respective cam ramps 80.

Thus there is provided a one-way clutch mounted between said shaft and the retarder for mounting the retarder on the shaft, the one-way clutch acting to disconnect the retarder from the shaft for free-wheeling thereon when the shaft is rotated in a direction to cause said hoist means to raise said load, and acting to connect the retarder to the shaft when the shaft is rotated in the opposite (load lowering) direction.

General

During light load handling, the hoist drum clutch 5 would be engaged to raise the load and drum brakes are used for stopping and controlling the load lowering velocity. The disconnect clutch function is not needed during this phase of the operation and it remains engaged all the time.

When medium to heavy loads are involved, the heat generated in the drum brakes, when used to control the lowering velocity, becomes excessive. To assist the brakes, the retarder is activated. In order to transmit the power to the retarder the drum clutch 5 must remain engaged. Load lowering velocities are usually higher than the maximum hoisting velocity. To prevent damage to the transmission 22 as a result of the high back-driving (lowering) speeds, disconnect clutch 20 has been provided. If this clutch were to be engaged when a heavy load is to be raised, it would have to absorb the entire energy required to synchronize the engine and transmission with the winch and the load inertia. To avoid the requirement of providing a clutch capable of handling this large energy, an interlock between the drum clutch 5 and disconnect clutch 20 has been provided which does not permit engagement of the disconnect clutch when the drum clutch is engaged, or in other words, the drum clutch must be disengaged before the disconnect clutch can be engaged. This reduces the output inertia to include the drive-line up to the drum clutch only, excluding the drum and the load. The result is a substantial reduction in the shift energy the clutch must handle which allows the use of a much smaller clutch.

Disconnect Clutch (20)

Referring now to FIG. 3, the disconnect clutch 20 has one of its elements 83 secured by splines to shaft 21. The hub 84 of the clutch 20 is secured by splines to shaft 17. Conventional interleaved friction plates 85 and 86 are splined, respectively, to element 83 and to the hub 84 and an actuating piston 87' is urged to the left (as viewed in FIG. 3) when its actuating chamber 88 is pressurized. Pressure fluid is admitted to chamber 88 through a clutch control valve 89 (FIG. 3) which may be of the centrifugally actuated type and as shown generally in U.S. Pat. Nos. 3,352,395 of Nov. 14, 1967 and 3,368,656 of Feb. 13, 1968, both of which have been assigned to an assignee common with the present invention.

The disconnect clutch 20, when engaged, provides a drive from the transmission 22 to shaft 17 and consequently through the hoist drum clutch 5 and to the hoist drum 4 for the purpose of raising the load attached to the cable 2. When the retarder R is used to control the lowering of the load, the disconnect clutch 20 is disengaged, thereby disconnecting the shaft 17 from the shaft 21, consequently disconnecting the gear transmission from the load lowering operation and thereby protecting the transmission by preventing its over-speeding during free-fall of the load and/or during the use of the load lowering function of the retarder.

Disconnect Clutch Control Valve (DCV)

A disconnect clutch control valve DCV functions to provide the "on" or "off" control for the disconnect clutch 20. Valve DCV is a three-way, two position, spring returned, normally closed valve that is pneumatically actuated by a pneumatic control signal from the pilot air preference valve PAPV via pneumatic line 90. A clutch apply pressure control valve 91 regulates the pressure in valve DCV. High pressure fluid is furnished by a charging pump P1 to the disconnect clutch control valve DCV via line 93, to the pressure control valve 91 via line 93a and to a circuitry switch valve CSV (to be described) via line 93b.

Cut-Off Valve 92

A manually operated cut-off valve 92 is provided in the conduit 92a leading to the apply chamber of clutch 20 for disconnecting the hoist drum during road transport of the rig by means of the drop box transmission 28.

Pneumatic System

The pneumatic control system (FIG. 8) provides on/off signals to the pneumatically operated hoist drum clutch 5 and to the disconnect clutch control valve DCV with an interlock to prevent engagement of the disconnect clutch 20 while the drum clutch 5 is engaged for controlled lowering by the retarder. This interlock prevents high energy engagement of the disconnect clutch 20. The disengagement of the disconnect clutch 20 upon reverse rotation (load-lowering), in order to positively prevent the transmission from over-speeding in this reverse (load lowering) direction is accomplished by the position of a manual control lever 94 (FIGS. 1 and 8) which combines the control of the hydraulically actuated clutch 20 and the control of the pneumatically actuated drum clutch 5.

Generally, clutch 20 acts to disconnect the power transmission 22 when the retarder R becomes operative to control the lowering speed of the load, and a pneumatic control system provides an on/off signal to the pneumatically operated hoist drum clutch 5 and to a disconnect clutch control valve DCV of the hydraulically actuated clutch 20 to thereby provide an interlock in the system to prevent engagement of the disconnect clutch 20 while the hoist drum clutch 5 is engaged for retarder controlled lowering, thereby acting to prevent high energy engagements of the disconnect clutch 20. Thus, the pneumatic circuit acts to protect clutch 20, as will now appear in more detail.

Figure 8:
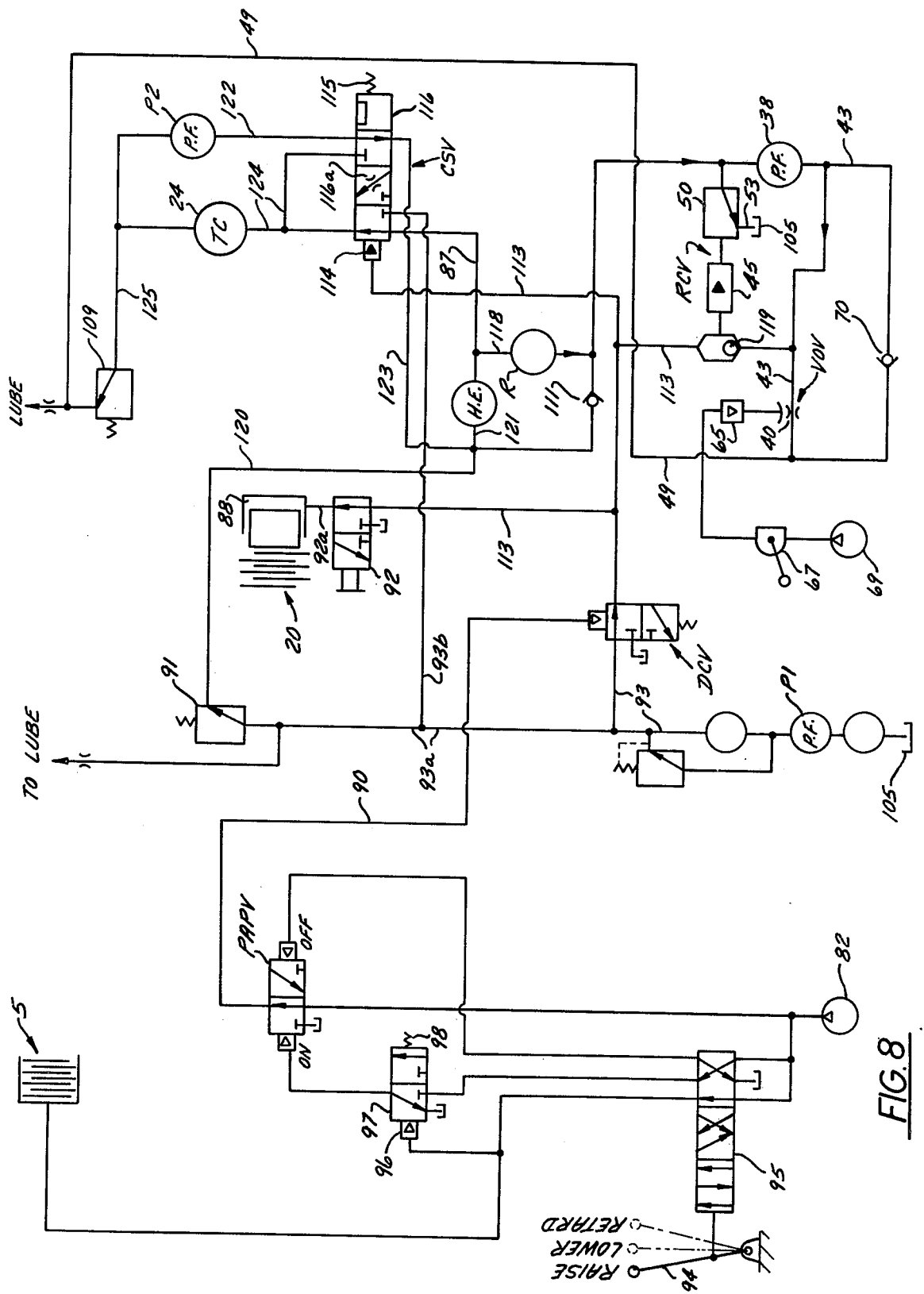
FIG. 8 is a combined diagram of the hydraulic circuit and the pneumatic circuit used with the present invention.

The function of the retarder system as pertaining to a winch drive is typically controlled from an operator's station indicated generally at 94a (FIG. 1). From that station the operator can effect engine throttle, gear range selection, drum brake application and drum clutch engagement. The drum clutch control lever 94 incorporates the control of the disconnect clutch 20. The lever has three positions: "raise", "lower", and "retard" as indicated in FIG. 8.

"Raise" Position

In the "raise" position, both clutches 5 and 10 are engaged. The manually controlled air valve 95 in the pneumatic diagram (FIG. 8) would be in the position shown, supplying air pressure in the pneumatically actuated drum clutch 5 and the pilot end 96 of pneumatic intercept valve 97. The intercept valve 97 prevents the "on" signal from reaching a pilot air preference valve PAPV as long as the drum clutch 5 is engaged—it does not prevent the valve PAPV from being in the "on" position as shown. The pilot air preference valve PAPV is a detented valve that will remain in a position until it reaches a pilot signal. As long as the "on" signal (also the drum clutch applied pressure) reaches the PAPV before the pressure in the line to the pilot end 96 of the pneumatic intercept valve 97 overcomes a return spring 98, the intercept valve does not interfer with the "on"-"off" control of the disconnect clutch 20. The air signal from the pilot air preference valve PAPV keeps (via conduit 90) the disconnect clutch control valve DCV in the clutch 20 engaged position. Maximum system pressure is fed to the disconnect clutch apply cylinder 88, engaging clutch 20.

"Lower" Position

When the drum clutch control lever 94 is moved to the "lower" position, the pneumatically actuated drum clutch 5 becomes disengaged by activating the manual control of the control air valve 95 (FIG. 8). The signal to the pilot air preference valve remains unchanged, thus the disconnect clutch control valve DCV remains in the clutch 20 engaged position. All light load lowering will be done with the lever in this intermediate position in which the retarder R is in effect not used due to the fact that the drum 4 is disconnected because the drum clutch 5 is not engaged.

"Retard" Position

For medium to heavy load lowering, the drum clutch control lever 94 (FIG. 8) will be moved to "retard". The position of the control air valve 95 will be as shown at the left hand side of the block diagram FIG. 8, so the drum clutch 5 will be engaged while the air valve 95 will provide an air signal to the "off" side of the pilot air preference valve PAPV causing the spring biased valve to shift to the "off" position and interrupt the pneumatic signal to the disconnect clutch control valve DCV. As the valve DCV shifts to the "off" position, it drains the disconnect clutch apply cylinder 88 disengaging clutch 20. The retarder is now drivingly connected to the load and disconnected from the transmission 22 for a load lowering operation under the influence of the retarder.

As previously mentioned, when the retarder is controllably lowering the load in this "retard" condition of operation, the pump 38 has a driving connection from the retarder and the rate at which the pump is driven is determined by the rotational speed of the retarder.

GENERAL

The present invention provides a retarder that can be adapted to existing transmission systems having hydraulic torque converters. Two primary considerations are the limited hydraulic circuit pressure capabilities of torque converters and the requirement to maintain maximum cooling oil flow to the torque converter during power transmission. For the retarder, on the other hand, it is desirable to operate at maximum fluid circuit pressure feasible in order to obtain a wide range of fluid pressure variation and thereby a broad torque spectrum. The retarder also needs to receive cooling oil during its phase of the operation.

The pressure range and cooling flow requirements as described above have been obtained with the present invention by utilizing a combined hydraulic system with a common sump and heat exchanger and without the addition of cooling pumps, as will appear.

In addition to the components mentioned previously, the hydraulic system also includes a sump 105, the previously mentioned charge pump P1, circulating pump P2, full flow filter 106, bypass valve 107, clutch pressure regulating valve 91, converter pressure regulating valve 109, torque converter 24, heat exchanger HE, retarder self-circulating check valve 111 and circuitry switch valve CSV.

Circuitry Switch Valve (CSV)

When the present invention is used in connection with a transmission having a torque converter, a CSV valve (FIGS. 6, 6a, 6b and 8) acts to switch the oil circuit from the torque converter mode (FIG. 6a) to a retarder mode (FIG. 6b) of operation, that is this valve allows the majority of the oil to circulate either through the converter 24 for load raising or through the retarder R for load lowering, depending upon which mode of operation is desired. More specifically, the circuitry switch valve CSV allows normal torque converter mode of operation (FIG. 6a) when the disconnect clutch control valve DCV is in the clutch engaged position and conduit 113 is pressurized. The pressure in conduit 87 and 87a (which is the retarder circuit inlet pressure) is always acting on both ends of valve spool 116, thus this spool is pressure balanced except for the cross-section area of pilot 114. The pressure in conduit 113 and area of pilot 114 (maximum system pressure) is sufficient to overcome the opposing retarder circuit inlet pressure and the force of bias spring 115, forcing spool 116 to the right as viewed in FIG. 6a and into torque converter mode.

As shown in FIG. 8, the fluid flow from pump P1 (via conduit 93a, valve 91 and conduits 120 and 121) and from pump P2 (via conduit 122, valve 116 and conduits 123 and 121) both pass through the heat exchanger HE and through the torque converter TC. The pressure in conduit 113 also acts on the pilot end 45 of the hoist retarder pressure control valve RCV, essentially closing that valve. Shuttle valve 119 separates conduit 113 and 43, permitting the high pressure signal to close the RCV valve without interfering with the variable pressure control system in the retarder mode. The pressure in the heat exchanger system will be governed by the setting of the converter pressure regulating valve 109 which is connected to the heat exchanger HE via passages 87, 124 and 125. The above results in a functional duplication of a conventional torque converter transmission hydraulic system.

The switch valve CSV is spring biased into the retarder mode of operation (FIG. 6b) when the pressure in conduit 113 is zero. Conduit 113 is drained only when the disconnect clutch control valve DCV is in the clutch disengaged position which occurs when the lever 94 of air control valve 95 is placed in the "retard" position as previously described.

The area differential between the two ends of spool 116 caused by pilot area 114 produces a hydraulic force proportional to the retarder circuit inlet pressure that also urges spool 116 into retarder mode (FIG. 6b). In this position, the valve CSV directs the flow of pump P2 via conduit 122, valve 116 and conduit 124 and also metered high pressure orifice flow through orifice 116a via passage 124 to the torque converter circuit. The balance of the fluid flow from pump P1 is forced through the retarder R and over the retarder pressure control valve 50 to sump.

Pressure in the heat exchanger HE and retarder system is governed by the retarder pressure control valve RCV which in turn is controlled by the pressure in conduit 43 (line 113 being drained) and is variable depending on the orifice element 57 setting and the speed of the output driven pump 38 as explained previously. The circuit pressure in the torque converter is independently governed by the converter pressure regulating valve 109, thus the circuitry switch valve CSV separates the retarder and converter circuits during this mode of operation. To summarize, the circuitry switch valve functions to integrate the transmission-torque converter hyraulic system and the retarder hydraulic system by directing fluid according to system requirements and mode of operation.

General

A retarder outlet check valve 111 is located at the discharge side of the retarder R and passageways 121 (FIG. 6) which lead from the retarder discharge side to the heat exchanger (oil cooler) HE and further via conduits 118 to the inlet side of the retarder, as shown. It permits self-circulation through the retarder and heat exchanger due to the pressure drop developed in the retarder at high speed reverse rotation.

This invention thus provides pressure fluid control means including a pressure fluid circuit and a variable flow fluid pump 38 in said circuit and driven at a variable speed and flow by the shaft 17, at a rate which is determined by the speed of the retarder during lowering of the load. That is to say the retarding action of the retarder R increases as the lowering speed of the load increases.

The pressure fluid control means also includes a variable orifice 40 in the circuit and in fluid communcation with the discharge side of the variable pump 38, the orifice acting to raise and lower the fluid pressure range through which the variable fluid flow from said pump 38 is modulated by fluid pressure in said retarder R.

Figure 9:
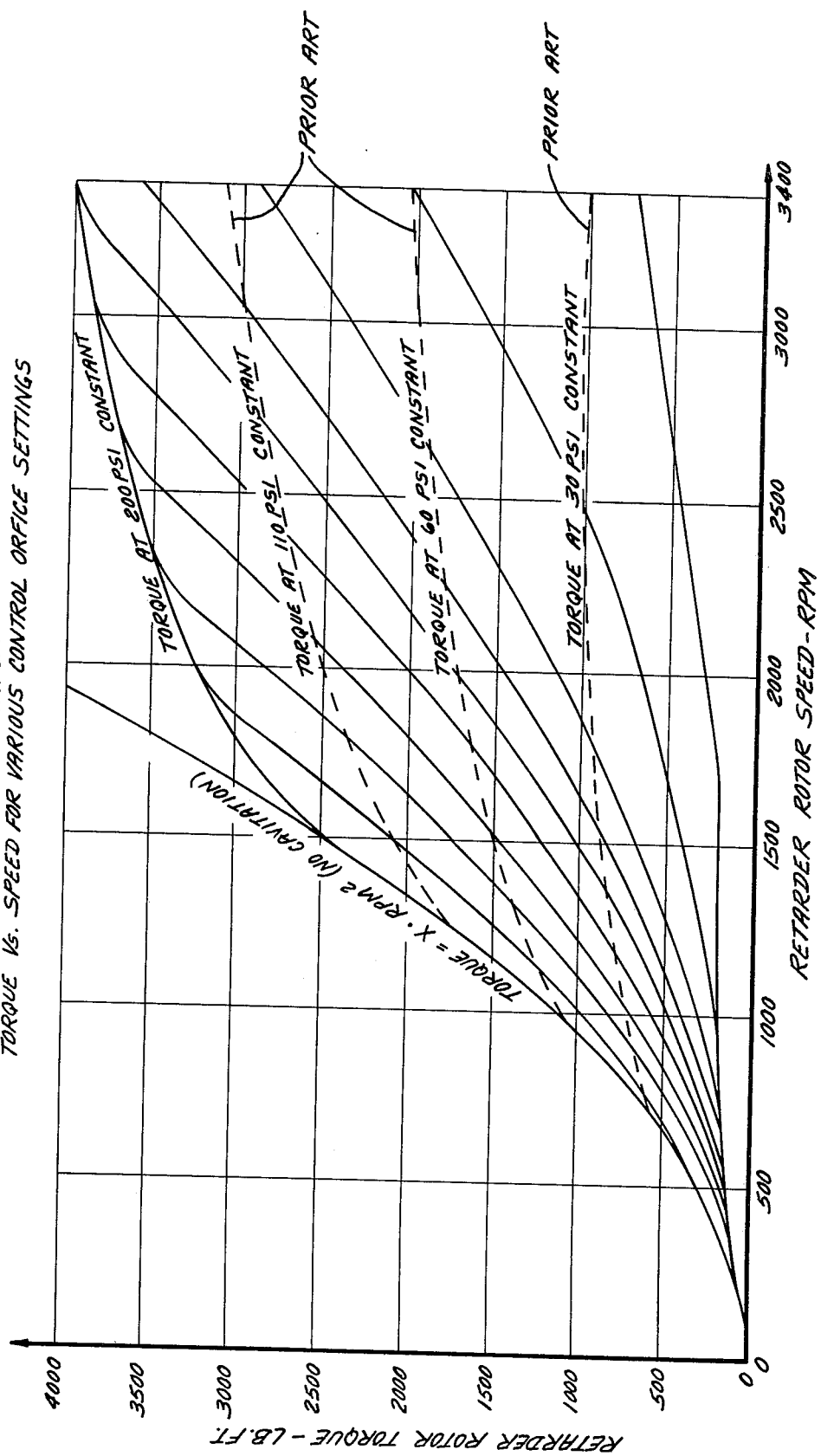
FIG. 9 is a graph on which is plotted the rotor torque against rotor speed for various control orifice settings in accordance with the present invention.

FIG. 9 illustrates the desirable characteristics of the pressure modulated retarder provided by the present invention and is a graph plotting the retarder rotor torque against the retarder rotor speed and showing how the retarder torque curves of the present invention (solid lines) rise at higher speeds and provides improved speed control at variable loads. These solid lines represent various orifice settings of the retarder control valve RCV. The retarder of the invention has low torque at low speeds and high rotor torque at high speeds, giving high initial load acceleration and good load lowering velocity control. The invention provides for torque adjustment of the retarder over a broad range in order to obtain desired lowering velocities for varying loads.

In contrast, the dotted lines of FIG. 9 represent curves of the prior art, constant pressure type retarder and show how the curves flatten out in torque value at higher rotor speeds. These curves show that after a certain speed, the torque increases with speed is substantially less. The basic circuit pressure settings shown provide a series of torque curves that branch off the square function curve at different speeds and torque levels.

The prior art retarder having constant but adjustable pressure settings does provide a means of matching the power absorption characteristics of the retarder to the load, but the torque versus speed relationship is undesirable for load lowering purposes. The poor torque response to speed changes in the cavitating range makes the prior art device unsuitable for speed control of a constant load. Minute variations in the applied load, drive line resistance, circuit pressure and even fluid temperature can result in substantial speed variation for a given pressure setting, i.e., there is no definite intersection between the torque applied by the load which would be represented by a horizontal line in the graph of FIG. 9, and the retarder torque curve. It is important to the operator of the system that the lowering velocity is predictable and repeatable. Another disadvantage of the relatively flat torque versus speed curve (dotted lines) for load lowering functions, is the high power absorption at speeds below the desired speed. The acceleration of the load is thus severely inhibited by the prior art retarder and the time to reach the desired lowering velocity can be excessive, and thus existing retarders are normally not used for light and medium lowering operations.

Modifications of Output Speed Sensing Means

As previously mentioned, the output speed sensing means for providing the above described speed signal may take forms other than the variable flow fluid pump 38 embodiment as follows. These other modifications are shown in FIGS. 10 through 13 inclusive which show fragmentary portions of the FIG. 3 structure including the shaft 17 from which the speed may be sensed.

Figure 10:
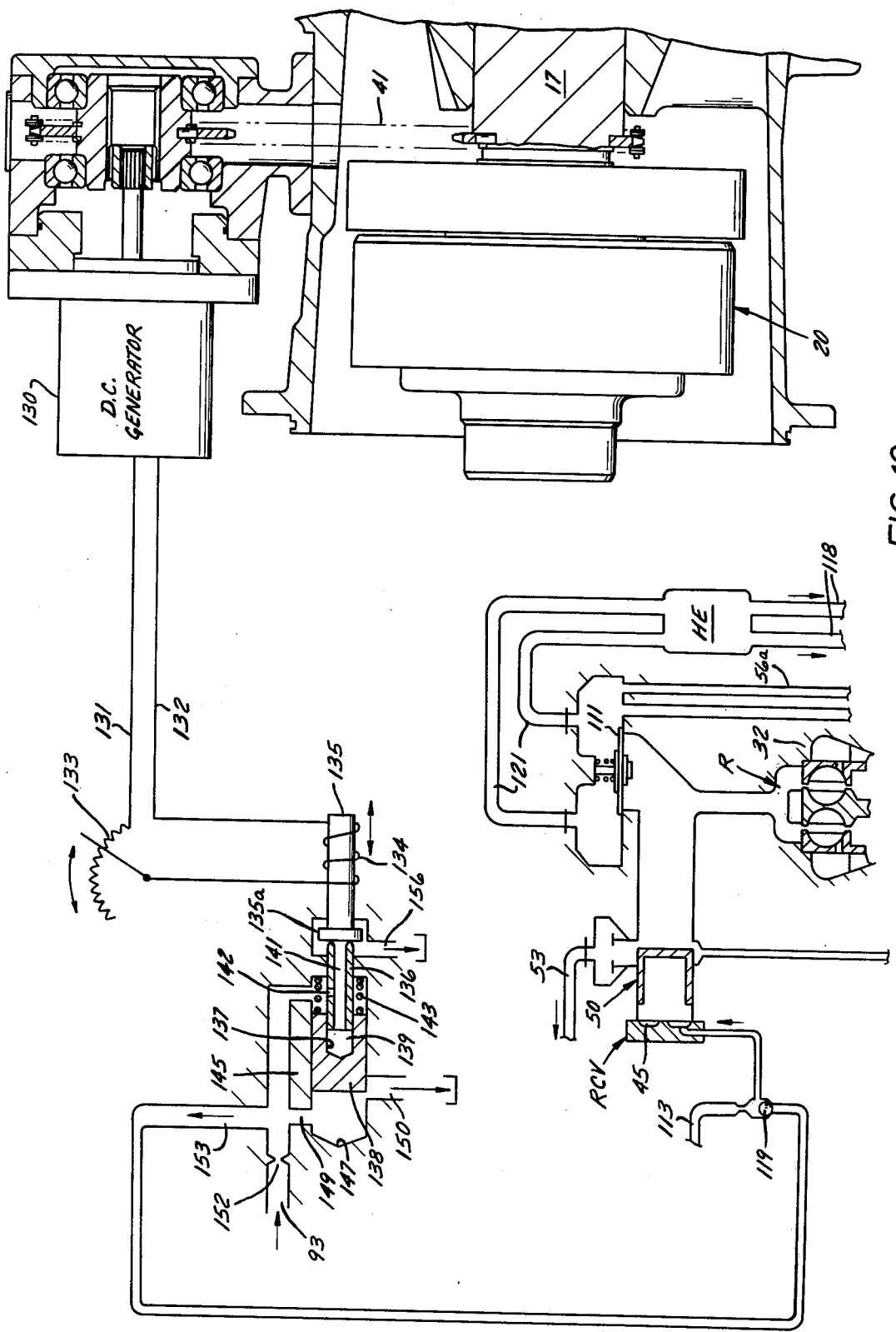
FIGS. 10 to 13 inclusive show modifications of the speed sensing means and show fragmentary portions of the FIG. 3 structure to which they are connection.

FIG. 10 shows a magnetic-electric system of speed sensing which can be used to replace the pump 38 and orifice valve VOV. Instead, a d.c. generator 130 is driven from chain 41 and is connected via its lines 131 and 132 to a variable resistor 133 and a magnetic coil 134 which surrounds shiftable plunger 135. The enlarged end 135a of the plunger abuts against a fixed sleeve element 136 extending into bore 137 of piston 138 to thereby define a cavity 139 therewith. The fixed sleeve element 136 has a central opening 141 extending axially therethrough and a cross port 142 in communication therewith. A spring 143 biases the piston 138 to the left as viewed in FIG. 10. The valve body 145 has a bore 147 in which the piston is slideable and from which bore the oil supply passage 149 and the discharge passage 150 both extend. Pressure fluid is supplied from the main oil supply line 93 via a restriction 152 and is directed via line 153 to the pilot end of the valve RCV.

The right hand end of fixed sleeve element 136 forms a valve seat with the end of the plunger 135 and a passage 156 drains this area to the sump. Thus, a variable resistor and a solenoid controlled pressure regulating valve is provided in which the force of the magnetic coil 134 determines the pressure at which the oil in cavity 139 can escape and thereby permit the piston 138 to shift to the right thereby regulating the oil pressure which is directed to the valve RCV. In other words, the pressure of the valve is proportional to the force on the plunger which in turn is a function of the voltage applied to the coil, or the current flowing though it.

Figure 11:
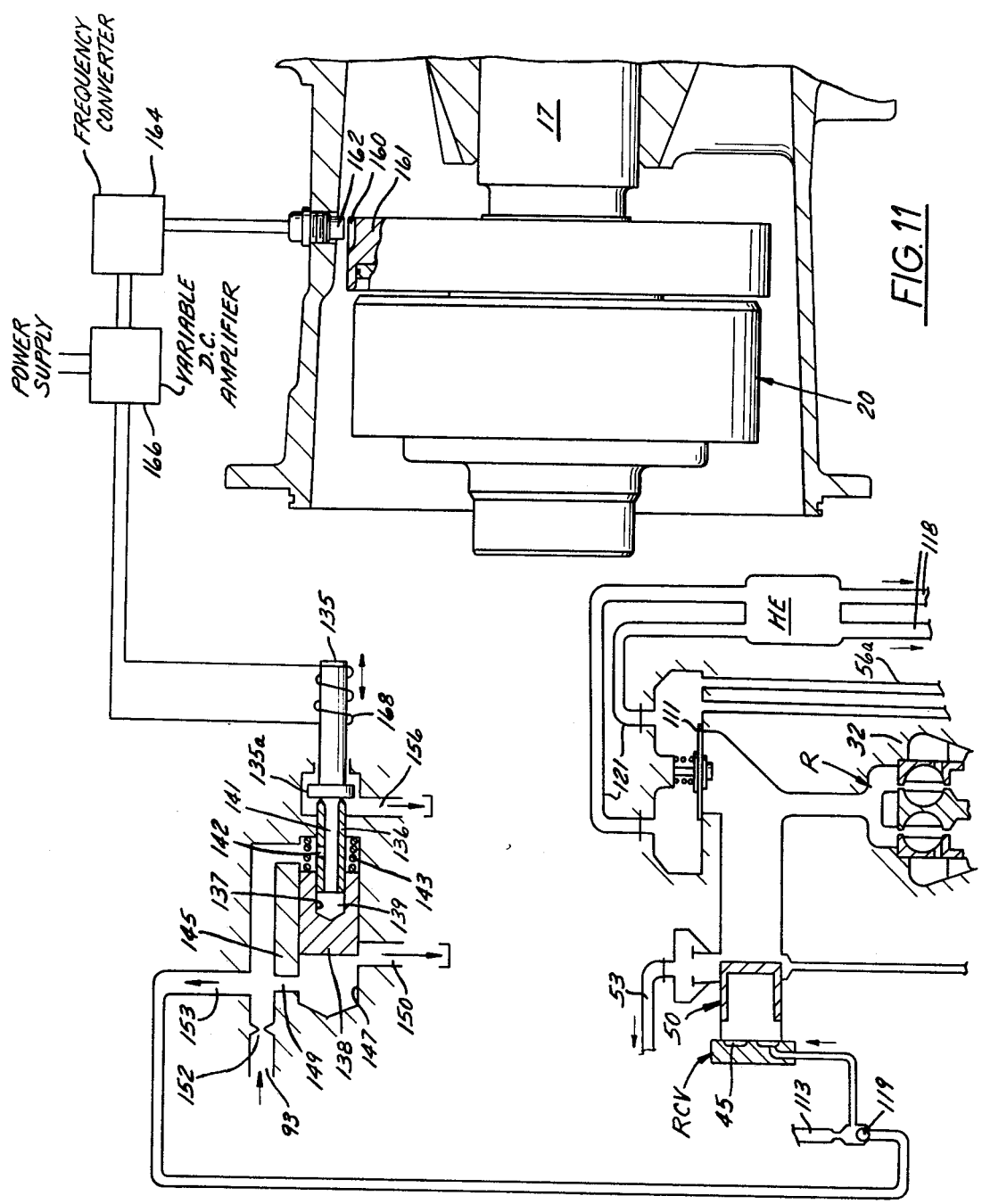

FIG. 11 shows a magnetic form of speed sensing means in which a series of notches 160 are formed around the periphery of the piston housing 161 fixed to shaft 17. A magnetic pick-up 162 which counts the number of notches passing by it and produces several electric pulses per revolution of the output shaft 17 which are received by a frequency converter 164 that convert them to d.c. voltage which increases with increasing frequency. A variable d.c. amplifier 166 is fed from the converter and furnishes such voltage to the coil 168 that surrounds the plunger 135. Other parts of this modification are similar to the FIG. 10 modification and have been correspondingly referenced. In this FIG. 11 modification of the invention, the force of the magnetic coil again determines at which pressure the oil in the cavity 139 can escape and permit the piston to move to the right, thereby regulating pressure to the RCV valve.

Figure 12:
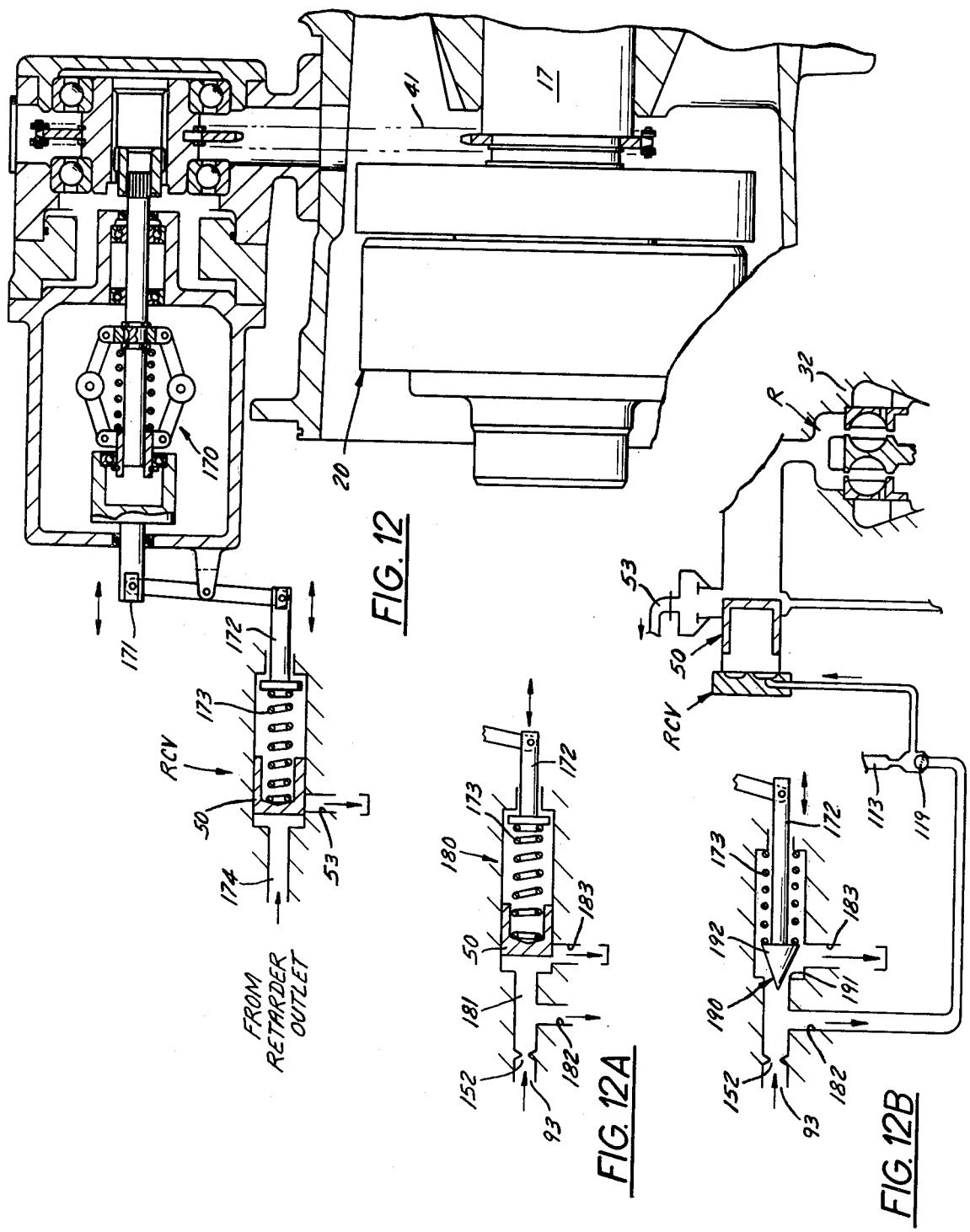

The FIG. 12 modification shows a mechanical means of speed sensing and consists of a fly ball governor 170 driven from the chain 41, the radial movement of the balls causes the shaft end 171 of the governor to shift in an axial direction thereby in turn axially shifting the linkage member 172 against and changing the bias of the spring 173. The resulting pressure then acts via spring 173 on the outlet pressure regulating valve piston 50 of the RCV valve. The conduit 174 conducts fluid pressure from the retarder oulet and conduit 53 is directed to the sump. Thus, the shiftable valve element 50 controls the fluid flow from the retarder outlet to the sump due to the action of the mechanical linkage which acts directly on the valve RCV.

A modified form of the FIG. 12 arrangement is shown in FIG. 12A where a modulated valve 180 is interposed between the member 172 and the line 181 which supplies the main pressure. Line 182 leads the resulting fluid pressure to the pilot end of the valve RCV. Line 183 dumps fluid to the sump as determined by the position of the shiftable valve element 50. Thus, the mechanical linkage 172 acts on a separate modulating valve 180.

FIG. 12B shows a modification of FIG. 12A in which a variable orifice 190 is provided between the shoulder 191 and the needle valve element 192, the linkage 172 from the governor thus acting directly on the variable orifice 190.

Figure 13:
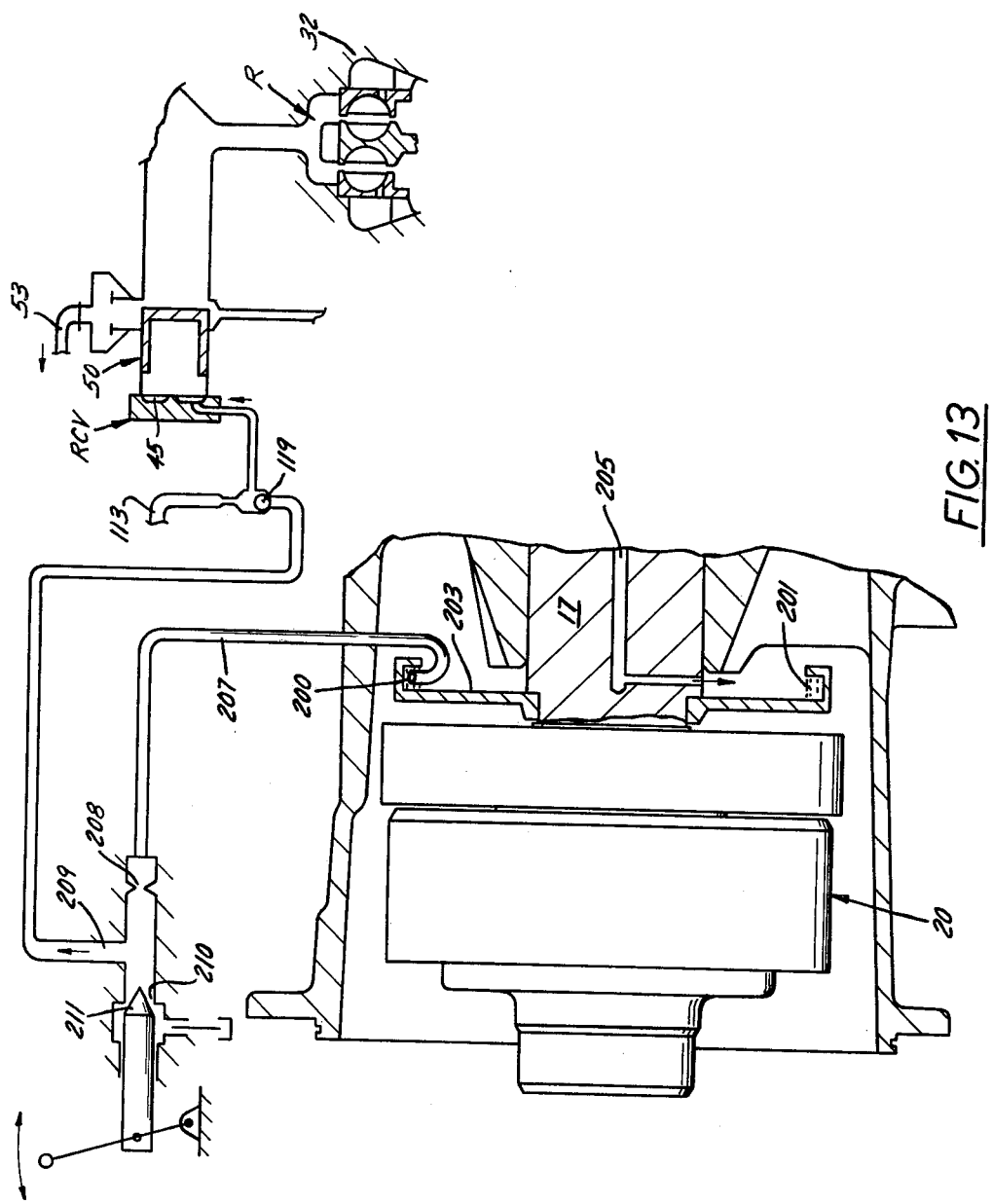

FIG. 13 is a modification of a hydraulic arrangement in which the speed sensing is done hydraulically and in which the inlet end of a stationary pilot tube 200 is located in a rotating oil chamber 201 that is formed by the member 203 secured to shaft 17. Oil is provided through passage 205 in the shaft to maintain the oil chamber 201 filled with oil. Rotating oil impinges on the open end of the tube 200 and produces pressure by converting kinetic energy of the oil into pressure. The pressure fluid is conducted via conduit 207 through an orifice 208 to a conduit 209 leading to the valve RCV. A varible orifice 210 is provided by the valve element 211 which permits a flow of fluid to sump and thereby regulates the pressure flow to the RCV valve via conduit 209. The signal produces is similar to that from the pump 38 and orifice 40 previously described.

I claim:

1. A power delivery system comprising a pressurized fluid circuit, a fluid pressurized and modulatable hydrodynamic retarder having a rotor drivingly connected to a power output shaft, said retarder having a pressure fluid inlet and a pressure fluid outlet in said circuit, a retarder outlet pressure control valve in said circuit, speed sensing means for sensing the rotational speed of said output shaft and for producing a corresponding pilot signal acting upon the retarder outlet pressure control valve, including means to infinitely modulate the fluid relief pressure of said valve as a predetermined and selectively variable function of rotor speed to thereby modulate the torque of said retarder in accordance with a predetermined desired torque-speed relationship.

2. The system set forth in claim 1 further characterized in that said speed sensing means is a variable flow fluid pump having a driving connection with said rotor for producing a pump discharge flow which is variable in accordance with the speed of said rotor.

3. The system described in claim 2 including a variable orifice in said circuit for receiving said pump discharge flow to thereby create said fluid relief pressure for said valve, said orifice being variable in size to selectively change the pressure range of said retarder outlet pressure.

4. The system as described in claim 1 further characterized in that said speed sensing means for sensing rotational speed of said output shaft is an electric means including a coil operated shiftable plunger, and a valve means operated by said plunger and in fluid communication with said retarder outlet pressure control valve for varying the fluid relief pressure thereof.

5. The system set forth in claim 4 further characterized in that said electric means includes a generator drivingly connected with said output shaft and connected with said plunger by means of a variable resistor.

6. The system set forth in claim 4 further characterized in that said electric means includes a magnetic pick-up for sensing rotational speed of said shaft, a frequency converter connected with said pick-up and also connected with a variable d.c. amplifier, said amplifier being connected with said coil operated plunger for actuation thereof.

7. The system set forth in claim 1 further characterized in that said speed sensing means is a mechanical governor connected with said shaft and having an output connected with said pressure control valve for actuation thereof.

8. A power delivery system comprising a pressurized fluid circuit, a fluid pressurized and modulatable hydrodynamic retarder having a rotor drivingly connected to a power output shaft, said retarder having a pressure fluid inlet and a pressure fluid outlet in said circuit, a retarder outlet pressure control valve in said circuit and located in the fluid outlet of said retarder and acting to modulate the fluid pressure in the retarder circuit by regulating the pressure fluid flow from said retarder, speed sensing means connected with and for sensing the rotational speed of said output shaft and for producing a corresponding pilot signal upon the retarder outlet pressure control valve, including means to infinitely modulate the fluid relief pressure of said valve as a predetermined and selectively variable function of rotor speed to thereby modulate the torque of said retarder in accordance with a predetermined desired torque-speed relationship.

9. The system set forth in claim 8 further characterized in that said speed sensing means is a variable flow fluid pump having a driving connection with said rotor for producing a pump discharge flow which is variable in accordance with the speed of said rotor.

10. The system described in claim 9 including a variable orifice in said circuit for receiving said pump discharge flow to thereby create said fluid relief pressure for said valve, said orifice being variable in size to selectively change the pressure range of said retarder outlet pressure.

11. The system as described in claim 8 further characterized in that said speed sensing means for sensing rotational speed of said output shaft is an electric means including a coil operated shiftable plunger, and a valve means operated by said plunger and in fluid communication with said retarder outlet pressure control valve for varying the fluid relief pressure thereof.

12. The system set forth in claim 11 further characterized in that said electric means includes a generator drivingly connected with said output shaft and connected with said plunger by means of a variable resistor.

13. The system set forth in claim 11 further characterized in that said electric means includes a magnetic pick-up for sensing rotational speed of said shaft, a frequency converter connected with said pick-up and also connected with a variable d.c. amplifier, said amplifier being connected with said coil operated plunger for actuation thereof.

14. The system set forth in claim 8 further characterized in that said speed sensing means is a mechanical governor connected with said shaft and having an output connected with said pressure control valve for actuation thereof.

15. A power delivery system comprising a rotatably driven power output shaft, a hoist means connected to and driven by said shaft for raising and lowering a load connected to said hoist means, a pressurized fluid circuit, a fluid pressurized and modulatable hydrodynamic retarder having a rotor, a one-way clutch mounted between said shaft and said retarder for mounting said retarder on said shaft, said one-way clutch disconnecting said rotor from said shaft for free-wheeling thereon when said shaft is rotated in a direction to cause said hoist means to raise said load, and connecting said rotor to said shaft when the latter is rotated in the opposite direction in lowering said load, said retarder having a pressure fluid inlet and a pressure fluid outlet in said circuit, a retarder outlet pressure control valve in said circuit, speed sensing means having a driving connection with said rotor when the latter is lowering said load whereby said sensing means senses the rotational speed of said output shaft and for producing a corresponding pilot signal acting upon the retarder outlet pressure control valve to increase the fluid relief pressure of said valve when the rotor speed increases and consequently cause increased torque of said retarder.

16. The system set forth in claim 15 further characterized in that said speed sensing means is a variable flow fluid pump having a driving connection with said rotor for producing a pump discharge flow which is variable in accordance with the speed of said rotor.

17. The system described in claim 16 including a variable orifice in said circuit for receiving said pump discharge flow to thereby create said fluid relief pressure for said valve, said orifice being variable in size to selectively change the pressure range of said retarder outlet pressure.

18. The system as described in claim 15 further characterized in that said speed sensing means for sensing rotational speed of said output shaft is an electric means including a coil operated shiftable plunger, and a valve means operated by said plunger and in fluid communication with said retarder outlet pressure control valve for varying the fluid relief pressure thereof.

19. The system set forth in claim 18 further characterized in that said electric means includes a generator drivingly connected with said output shaft and connected with said plunger by means of a variable resistor.

20. The system set forth in claim 18 further characterized in that said electric means includes a magnetic pick-up for sensing rotational speed of said shaft, a frequency converter connected with said pick-up and also connected with a variable d.c. amplifier, said amplifier being connected with said coil operated plunger for actuation thereof.

21. The system set forth in claim 15 further characterized in that said speed sensing means is a mechanical governor connected with said shaft and having an output connected with said pressure control valve for actuating thereof.

22. The system set forth in claim 15 further characterized in that said hoist means has a pneumatically actuated hoist clutch, and said system includes a hydraulically actuated disconnect clutch connected to said shaft for disconnecting said shaft from a power source, a pneumatically actuated disconnect clutch control valve for causing engagement and disengagement of said disconnect clutch, and a pneumatic circuit including pneumatic control valve means connected between said hoist clutch and said disconnect clutch control valve and providing an interlock therebetween which prevents engagement of said disconnect clutch while said hoist clutch is engaged for lowering the load through said retarder.

23. A power delivery system for hoisting apparatus for raising and lowering a load and comprising, a power source, a change speed gear transmission driven by said source, a rotatable power output shaft driven by said transmission, a rotatable hoist means drivingly connected to said shaft and including a pneumatically actuated hoist clutch,
a pressure fluid circuit, a hydraulically actuated disconnect clutch disengageably connected to and between said transmission and said shaft, a pneumatically actuated disconnect clutch control valve in said circuit for causing actuation of said disconnect clutch, a fluid pressurized and modulatable hydrodynamic retarder having a rotor drivingly connected to said power output shaft, said retarder having a pressure fluid inlet and a pressure fluid outlet in said circuit, a retarder outlet pressure control valve in said circuit, speed sensing means for sensing the rotational speed of said output shaft and producing a pilot signal acting upon the retarder control valve to increase the fluid relief pressure of said retarder valve when the rotor speed increases to thereby cause increased torque of said retarder,
a one-way clutch mounted between said shaft and said retarder for mounting said rotor on said shaft, said one-way clutch constructed and arranged for disconnecting said rotor from said shaft for freewheeling thereon when said shaft is rotated in a direction to cause said hoist means to raise said load, and for connecting said rotor to said shaft when the latter is rotated in the opposite direction in lowering said load.

24. The system set forth in claim 23 further characterized in that said sensing means is a variable flow fluid pump having a driving connection with said rotor when the latter is lowering said load whereby said pump is driven at a rate which is determined by the rotational speed of the rotor when lowering the load, said pump having a fluid discharge side in said circuit.

25. The system described in claim 23 including a variable orifice in said circuit for receiving said pump discharge flow to thereby create said fluid relief pressure for said valve, said orifice being variable in size to selectively change the pressure range of said retarder outlet pressure.

26. The system set forth in claim 23 including a pneumatic circuit having pneumatic control valve means connected between said pneumatically actuated hoist clutch and said disconnect clutch control valve and providing an interlock therebetween which prevents engagement of said disconnect clutch and consequently prevents operation of said transmission while said hoist clutch is engaged for lowering the load through said retarder.

27. A power delivery system for hoisting apparatus for raising and lowering a load and comprising, a power source, a hydraulic torque converter driven by said source, a rotatable power output shaft driven by said torque converter, a rotatable hoist means drivingly connected to said shaft, a pressure fluid circuit, a fluid pressurized and modulatable hydrodynamic retarder having a rotor drivingly connected to said power output shaft, said retarder having a pressure fluid inlet and a pressure fluid outlet in said circuit, a retarder outlet pressure control valve in said circuit, speed sensing means for sensing the rotational speed of said output shaft and for producing a corresponding pilot signal acting upon the retarder control valve to increase the fluid relief pressure of said retarder outlet pressure control valve when the rotor speed increases to thereby cause increased torque of said retarder,
a one-way clutch mounted between said shaft and said retarder for mounting said rotor on said shaft, said one-way clutch constructed and arranged for disconnecting said rotor from said shaft for freewheeling thereon when said shaft is rotated in a direction to cause said hoist means to raise said load, and for connecting said rotor to said shaft when the latter is rotated in the opposite direction in lowering said load;
a circuitry switch valve in said circuit and in fluid communication selectively with said torque converter and with said retarder for selectively directing pressure fluid (1) to said torque converter for raising said load or (2) to said retarder for lowering said load.

28. The system set forth in claim 27 further characterized in that said sensing means is a variable flow fluid pump having a driving connection with said rotor when the latter is lowering said load whereby said pump is driven at a rate which is determined by the rotational speed of the rotor when lowering said load, said pump having a fluid discharge side in said circuit.

29. The system described in claim 28 including a variable orifice in said circuit for receiving said pump discharge flow to thereby create said fluid relief pressure for said valve, said orifice being variable in size to selectively change the pressure range of said retarder outlet pressure.

30. A power delivery system for hoisting apparatus for raising and lowering a load and comprising, a power source, a hydraulic torque converter driven by said source, a change speed gear transmission driven by said torque converter, a rotatable power output shaft driven by said transmission, a rotatable hoist means drivingly connected to said shaft and including a pneumatically actuated hoist clutch, a pressure fluid circuit, a hydraulically actuated disconnect clutch disengageably connected to and between said transmission and said shaft, a pneumatically actuated disconnect clutch control valve in said circuit for causing actuation of said disconnect clutch, a fluid pressurized and modulatable hydrodynamic retarder having a rotor drivingly connected to said power output shaft, said retarder having a pressure fluid inlet and a pressure fluid outlet in said circuit, a retarder outlet pressure control valve in said circuit, speed sensing means for sensing the rotational speed of said output shaft and for producing a corresponding pilot signal acting upon the retarder control valve to increase the fluid relief pressure of said retarder outlet pressure control valve when the rotor speed increases to thereby cause increased torque of said retarder, a one-way clutch mounted between said shaft and said retarder for mounting said rotor on said shaft, said one-way clutch constructed and arranged for disconnecting said rotor from said shaft for freewheeling therein when said shaft is rotated in a direction to cause said hoist means to raise said load, and for connecting said rotor to said shaft when the latter is rotated in the opposite direction in lowering said load, a pneumatic circuit having pneumatic control valve means connected between said pneumatically actuated hoist clutch and said disconnect clutch control valve and providing an interlock therebetween which prevents engagement of said disconnect clutch and consequently prevents operation of said transmission while said hoist clutch is engaged for lowering the load through said retarder, and a circuitry switch valve in said circuit and in fluid communication selectively with said torque converter and with said retarder for selectively directing pressure fluid (1) to said torque converter for raising said load or (2) to said retarder for lowering said load.

31. The system set forth in claim 30 further characterized in that said sensing means is a variable flow fluid pump having a driving connection with said rotor when the latter is lowering said load whereby said pump is driven at a rate which is determined by the rotational speed of the rotor when lowering said load, said pump having a fluid discharge side in said circuit.

32. The system described in claim 31 including a variable orifice in said circuit for receiving said pump discharge flow to thereby create said fluid relief pressure for said valve, said orifice being variable in size to selectively change the pressure range of said retarder outlet pressure.

33. A self-propelled, drill service rig comprising,
a wheeled vehicle having,
a power source for propelling the vehicle over the ground,
a hoist means including a rotatable hoist drum and a clutch for said drum,
a torque converter driven by said power source,
a change speed hoist transmission driven by said torque converter,
a power output shaft driven by said transmission and drivingly connected with said hoist means,
a hydraulically actuated disconnect clutch disengageably connected to and between said transmission and said shaft,
a pressure fluid circuit,
a pneumatically actuated disconnect clutch control valve in said circuit for causing actuation of said disconnect clutch, a fluid pressurized and modulatable hydrodynamic retarder having a rotor drivingly connected to said power output shaft, said retarder having a pressure fluid inlet and a pressure fluid outlet in said circuit, a retarder outlet pressure control valve in said circuit, speed sensing means for sensing the rotational speed of said output shaft and for producing a corresponding pilot signal acting upon the retarder control valve to increase the fluid relief pressure of said retarder outlet pressure control valve when the rotor speed increases to thereby cause increased torque of said retarder,
a one-way clutch mounted between said shaft and said retarder for mounting said rotor on said shaft, said one-way clutch constructed and arranged for disconnecting said rotor from said shaft for freewheeling thereon when said shaft is rotated in a direction to cause said hoist means to raise said load, and for connecting said rotor to said shaft when the latter is rotated in the opposite direction in lowering said load,
a pneumatic circuit having pneumatic control valve means connected between said pneumatically actuated hoist clutch and said disconnect clutch control valve and providing an interlock therebetween which prevents engagement of said disconnect clutch and consequently prevents operation of said transmission while said hoist clutch is engaged for lowering the load through said retarder,
and a circuitry switch valve in said circuit and in fluid communication selectively with said torque converter and with said retarder for selectively directing pressure fluid (1) to said torque converter for raising said load or (2) to said retarder for lowering said load.

34. The system set forth in claim 33 further characterized in that said speed sensing means is a variable flow fluid pump having a driving connection with said rotor for producing a pump discharge flow which is variable in accordance with the speed of said rotor.

35. The system described in claim 34 including a variable orifice in said circuit for receiving said pump discharge flow to thereby create said fluid relief pressure for said valve, said orifice being variable in size to selectively change and pressure range of said retarder outlet pressure.

* * * * *